(No Model.)
J. T. SENN.
GUANO DISTRIBUTER.
No. 261,771. Patented July 25, 1882.
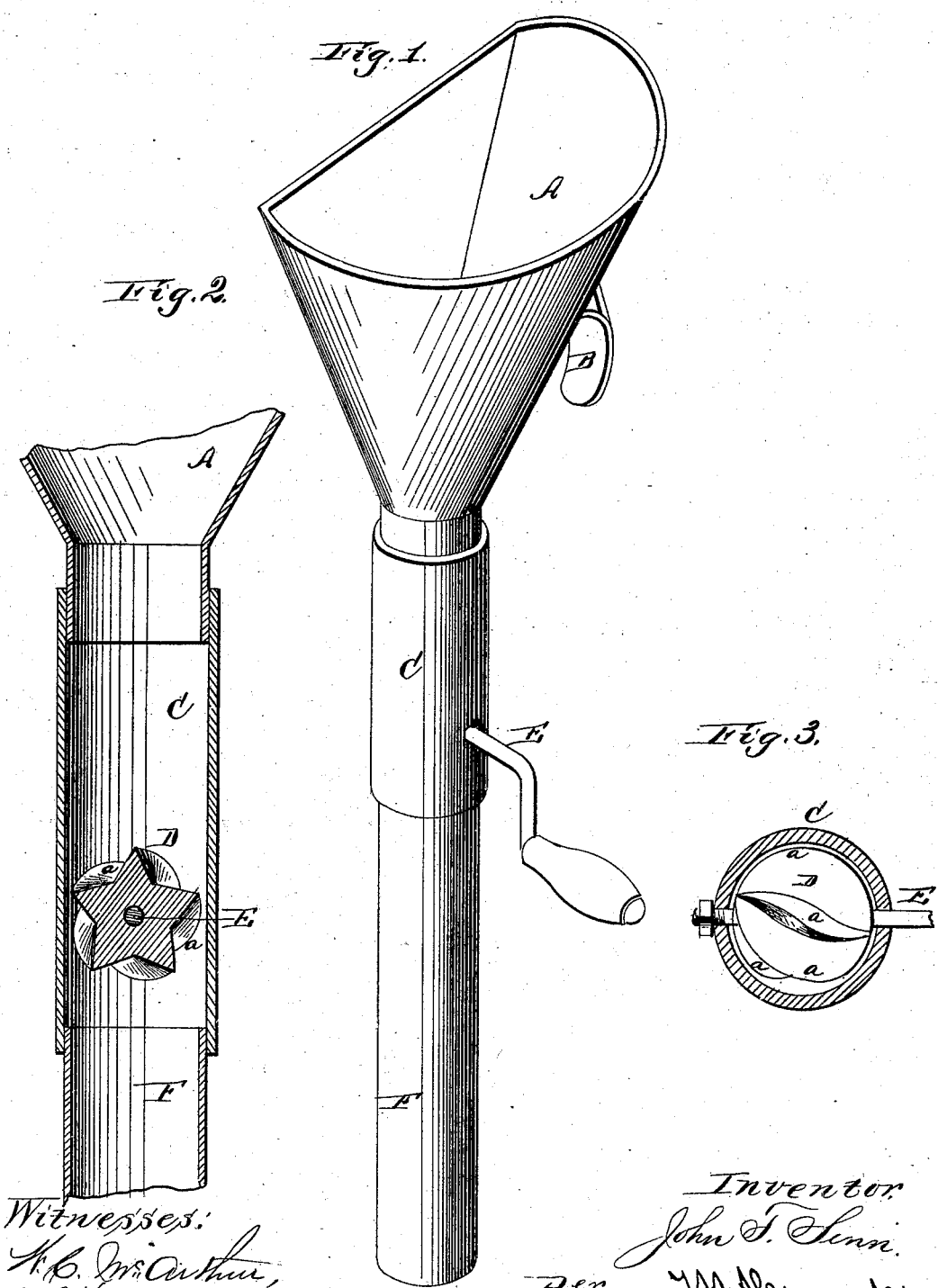

UNITED STATES PATENT OFFICE.

JOHN T. SENN, OF TROY, ALABAMA.

GUANO-DISTRIBUTER.

SPECIFICATION forming part of Letters Patent No. 261,771, dated July 25, 1882.

Application filed May 3, 1882. (No model.)

*To all whom it may concern:*

Be it known that I, JOHN T. SENN, of Troy, in the county of Pike and State of Alabama, have invented certain new and useful Improvements in Guano-Distributers; and I do hereby declare that the following is a full, clear, and exact description thereof, reference being had to the accompanying drawings, and to the letters of reference marked thereon, which form part of this specification, in which—

Figure 1 is a perspective view. Fig. 2 is a vertical section. Fig. 3 is a horizontal section.

This invention relates to portable guano-distributers; and the nature of my invention consists in the combination of a funnel formed of sheet metal, a conducting-tube formed of the same metal, an intermediate cast-metal coupling, and a spheroidal pulverizer and feeder, as will be fully understood from the following description, when taken in connection with the annexed drawings.

In planting corn in hills or in rows it is necessary to fertilize the hills or rows where the ground is poor. In combination with corn-planters, means have been employed for discharging guano and other fertilizing material at the same time that the seed is planted.

My object is to furnish an implement which will enable a person to distribute at will a large or a small quantity of guano or other fertilizer upon any hill or ridge requiring it.

A designates a hopper or funnel, one side of which is flattened so that is adapted to be held close to the body, and B designates a hook, which is one means for attaching the funnel to a belt or other appliance fixed to the person who uses the implement. The tubular neck of the funnel or hopper A is fitted into a cast-metal tube, C, and is removable therefrom. This cast-metal tube C has a spheroidal crusher, D, applied inside of it, which is formed of beveled wings $a$, and which is fixed on a shaft, E, that passes diametrically through the tube C, and has a hand-crank on one end.

To the lower end of the cast-metal tube C, I suitably secure a sheet-metal conducting-tube, F, which may be made of any desired length.

In reference to the funnel and the conducting-tube, I have described them as being made of thin metal. I prefer to make these parts light; but it is obvious that they may be made of cast metal.

Having described my invention, I claim—

1. The combination, in a guano-distributer, of the spherical flanged rotary crusher and feeder D, a rigid tubular section, C, a hopper, and a discharging-tube fitted into the said section C, substantially in the manner described.

2. The combination of the spherical flanged crusher and feeder D, the rigid coupling-tube in which this feeder D is applied, the hand-crank E on the latter, the tube F, the funnel, and the hook attachment B, all substantially in the manner and for the purposes described.

In testimony that I claim the foregoing as my own I affix my signature in presence of two witnesses.

JOHN T. SENN.

Witnesses:
A. C. WORTHY,
W. L. HILLIARD.